United States Patent
Kaufman et al.

[11] Patent Number: 5,783,489
[45] Date of Patent: Jul. 21, 1998

[54] MULTI-OXIDIZER SLURRY FOR CHEMICAL MECHANICAL POLISHING

[75] Inventors: Vlasta Brusic Kaufman, Geneva; Shumin Wang, Naperville, both of Ill.

[73] Assignee: Cabot Corporation, Boston, Mass.

[21] Appl. No.: 718,937

[22] Filed: Sep. 24, 1996

[51] Int. Cl.$^6$ .................................................. B44C 1/22
[52] U.S. Cl. .................... 438/692; 438/693; 252/79.2; 51/308; 51/309; 106/3
[58] Field of Search ........................ 438/692, 693; 252/79.2; 51/308, 309; 106/3

[56] References Cited

U.S. PATENT DOCUMENTS

| | | |
|---|---|---|
| 3,385,682 | 5/1968 | Lowen . |
| 3,668,131 | 6/1972 | Banush et al. . |
| 4,671,851 | 6/1987 | Beyer et al. . |
| 4,789,648 | 12/1988 | Chow et al. . |
| 4,818,333 | 4/1989 | Michaud . |
| 4,910,155 | 3/1990 | Cote et al. . |
| 4,944,836 | 7/1990 | Beyer et al. . |
| 4,954,459 | 9/1990 | Avanzino et al. . |
| 4,956,313 | 9/1990 | Cote et al. . |
| 4,992,135 | 2/1991 | Doan . |
| 5,137,544 | 8/1992 | Medellin . |
| 5,157,876 | 10/1992 | Medellin . |
| 5,173,438 | 12/1992 | Sandhu . |
| 5,209,816 | 5/1993 | Yu et al. . |
| 5,244,534 | 9/1993 | Yu et al. . |
| 5,256,402 | 10/1993 | Prencipe et al. . |
| 5,340,370 | 8/1994 | Cadien et al. . |
| 5,354,490 | 10/1994 | Yu et al. . |
| 5,389,194 | 2/1995 | Rostoker et al. . |
| 5,391,258 | 2/1995 | Brancaleoni et al. . |
| 5,407,526 | 4/1995 | Danielson et al. . |
| 5,476,606 | 12/1995 | Brancaleoni . |
| 5,527,423 | 6/1996 | Neville et al. . |
| 5,540,810 | 7/1996 | Sandhu et al. . |
| 5,575,837 | 11/1996 | Kodama et al. . |

*Primary Examiner*—Deborah Jones

[57] ABSTRACT

A chemical mechanical polishing slurry comprising at least two oxidizing agents, an organic acid and an abrasive and a method for using the chemical mechanical polishing slurry to remove titanium, titanium nitride, and an aluminum alloy containing layer from a substrate.

38 Claims, No Drawings

MULTI-OXIDIZER SLURRY FOR CHEMICAL MECHANICAL POLISHING

BACKGROUND OF THE INVENTION

1. Field of the Invention

This invention concerns a chemical mechanical polishing slurry including at least two oxidizers. The chemical mechanical polishing slurry is useful for polishing metal layers and thin-films associated with semiconductor manufacturing. More particularly this invention concerns a chemical mechanical polishing slurry that is especially adapted for polishing multiple metal layers and thin-films where one of the layers or films is comprised of aluminum or an aluminum containing alloy and another layer or thin film is comprised of titanium or a titanium containing alloy such as titanium nitride.

2. Description of the Art

Integrated circuits are made up of millions of active devices formed in or on a silicon substrate. The active devices, which are initially isolated from one another, are interconnected to form functional circuits and components. The devices are interconnected through the use of well-known multilevel interconnections. Interconnection structures normally have a first layer of metallization, an interconnection layer, a second level of metallization, and sometimes a third and subsequent level of metallization. Interlevel dielectrics such as doped and undoped silicon dioxide ($SiO_2$), are used to electrically isolate the different levels of metallization in a silicon substrate or well. The electrical connections between different interconnection levels are made through the use of metallized vias. U.S. Pat. No. 4,789,648, which is incorporated herein by reference, describes a method for preparing multiple metallized layers and metallized vias in insulator films. In a similar manner, metal contacts are used to form electrical connections between interconnection levels and devices formed in a well. The metal vias and contacts may be filled with various metals and alloys including titanium (Ti), titanium nitride (TiN), tantalum (Ta), aluminum copper (Al—Cu), aluminum silicon (Al—Si), copper (Cu), tungsten (W), and combinations thereof. The metal vias and contacts generally employ an adhesion layer such as titanium nitride (TiN) and/or titanium (Ti) to adhere the metal layer to the $SiO_2$ substrate. At the contact level, the adhesion layer acts as a diffusion barrier to prevent the filled metal and $SiO_2$ from reacting.

In one semiconductor manufacturing process, metallized vias or contacts are formed by a blanket metal deposition followed by a chemical mechanical polish (CMP) step. In a typical process, via holes are etched through an interlevel dielectric (ILD) to interconnection lines or to a semiconductor substrate. Next, a thin adhesion layer such as titanium nitride and/or titanium is generally formed over the ILD and is directed into the etched via hole. Then, a metal film is blanket deposited over the adhesion layer and into the via hole. Deposition is continued until the via hole is filled with the blanket deposited metal. Finally, the excess metal is removed by chemical mechanical polishing, (CMP) to form metal vias. Processes for manufacturing and/or CMP of ILD's are disclosed in U.S. Pat. Nos. 4,671,851, 4,910,155 and 4,944,836.

In a typical chemical mechanical polishing process, the substrate is placed in direct contact with a rotating polishing pad. A carrier applies pressure against the backside of the substrate. During the polishing process, the pad and table are rotated while a downward force is maintained against the substrate back. An abrasive and chemically reactive solution, commonly referred to as a "slurry" is applied to the pad during polishing. The slurry initiates the polishing process by chemically reacting with the film being polished. The polishing process is facilitated by the rotational movement of the pad relative to the substrate as slurry is provided to the wafer/pad interface. Polishing is continued in this manner until the desired film on the insulator is removed.

The slurry composition is an important factor in the CMP step. Depending on the choice of the oxidizing agent, the abrasive, and other useful additives, the polishing slurry can be tailored to provide effective polishing to metal layers at desired polishing rates while minimizing surface imperfections, defects and corrosion and erosion. Furthermore, the polishing slurry may be used to provide controlled polishing selectivities to other thin-film materials used in current integrated circuit technology such as titanium, titanium nitride and the like.

Typically CMP polishing slurries contain an abrasive material, such as silica or alumina, suspended in an oxidizing, aqueous medium. For example, U.S. Pat. No. 5,244,534 to Yu et al. reports a slurry containing alumina, hydrogen peroxide, and either potassium or ammonium hydroxide that is useful to remove tungsten at predictable rates with little removal of the underlying insulating layer. U.S. Pat. No. 5,209,816 to Yu et al. discloses a slurry comprising perchloric acid, hydrogen peroxide and a solid abrasive material in an aqueous medium that is useful for polishing aluminum. U.S. Pat. No. 5,340,370 to Cadien and Feller discloses a tungsten polishing slurry comprising approximately 0.1M potassium ferricyanide, approximately 5 weight percent silica and potassium acetate. Acetic acid is added to buffer the pH at approximately 3.5.

U.S. Pat. No. 4,789,648 to Beyer et al. discloses a slurry formulation using alumina abrasives in conjunction with sulfuric, nitric, and acetic acids and deionized water. U.S. Pat. Nos. 5,391,258 and 5,476,606 disclose slurries for polishing a composite of metal and silica which includes an aqueous medium, abrasive particles and an anion which controls the rate of silica removal. Other polishing slurries for use in CMP applications are described in U.S. Pat. No. 5,527,423 to Neville et al., U.S. Pat. No. 5,354,490 to Yu et al., U.S. Pat. No. 5,340,370 to Cadien et al., U.S. Pat. No. 5,209,816 to Yu et al., U.S. Pat. No. 5,157,876 to Medellin, U.S. Pat. No. 5,137,544 to Medellin, and U.S. Pat. No. 4,956,313 to Cote et al.

It has been recognized that CMP slurries that are used to polish multiple metal layers in a single step typically exhibit a low polishing rate towards at least one of the metal layers. As a result, the polishing step is lengthened or operated at aggressive polishing conditions that can cause undesirable erosion of the $SiO_2$ layer and recessing of the metal vias and/or metal lines. Such recessing causes a non-planar via layer or metal line layer to be formed which impairs the ability to print high resolution lines during subsequent photolithography steps and can cause the formation of voids or open circuits in the formed metal interconnections. Additionally, recessing increases when over polishing is used to ensure complete removal of the titanium, titanium nitride, and aluminum films across the surface of a wafer. Thus, a need remains for CMP slurries which reliably polish a plurality of metal layers including a titanium layer in an integrated circuit. Accordingly, a new CMP polishing slurry that polishes titanium at a higher rate is needed to overcome the present substrate manufacturing reliability issues.

SUMMARY OF THE INVENTION

The present invention is directed to a single chemical mechanical polishing slurry that is able to polish aluminum alloy, titanium, and titanium nitride layers at acceptable rates.

In addition, the chemical mechanical polishing slurry has a low insulator polishing selectivity while exhibiting high polishing selectivities towards titanium, titanium nitride, and aluminum.

Furthermore, this invention is directed to methods for using a single chemical mechanical polishing slurry to polish a plurality of metal layers in an integrated circuit.

In one embodiment, this invention is an aqueous chemical mechanical polishing slurry. The chemical mechanical polishing slurry comprises an abrasive, from about 0.2 to about 10.0 weight percent of a first oxidizer, from about 0.5 to about 10.0 weight percent of a second oxidizer, and from about 0.5 to about 3.0 weight percent of at least one organic acid. The chemical mechanical polishing slurry should have a pH of from about 2.0 to about 8.0.

In another embodiment, this invention is an aqueous chemical mechanical polishing slurry. The chemical mechanical polishing slurry comprises alumina, from about 0.2 to about 10.0 weight percent ammonium persulfate, from about 0.5 to about 10.0 weight percent hydrogen peroxide, and from about 0.5 to about 3.0 succinic acid. Furthermore, the pH of the chemical mechanical polishing slurry ranges from about 2.0 to about 8.0.

In still another embodiment, this invention is a method for polishing a substrate. The method includes admixing an abrasive, from about 0.2 to about 10.0 weight percent of a first oxidizer, from about 0.5 to about 10.0 weight percent of a second oxidizer, from about 0.5 to about 3.0 weight percent of at least one organic acid, and deionized water to give a chemical mechanical polishing slurry. Next, the chemical mechanical polishing slurry is applied to the substrate and at least a portion of a titanium layer, at least a portion of a titanium nitride adhesion layer and at least a portion of an aluminum alloy containing layer associated with the substrate are removed by bringing a pad into contact with the substrate and moving the pad in relation to the substrate.

DESCRIPTION OF THE CURRENT EMBODIMENT

The present invention relates to a chemical mechanical polishing slurry that comprises an abrasive and at least two oxidizers. The chemical mechanical polishing slurry is used to polish at least one metal layer associated with a substrate selected from the group including integrated circuits, thin films, multiple level semiconductors, and wafers. In particular, the chemical mechanical polishing slurry of this invention has been found to exhibit excellent polishing selectivities when used to polish a substrate including titanium, titanium nitride, and aluminum alloy containing layers in a single step, multiple metal layer chemical mechanical polishing process.

Before describing the details of the various preferred embodiments of this invention, some of the terms that are used herein will be defined. The chemical mechanical polishing slurry, ("CMP slurry"), is a useful product of this invention that comprises an at least two oxidizing agents, an abrasive, an organic acid, and other optional ingredients. The CMP slurry is useful for polishing a multiple level metallization which may include but are not limited to semiconductor thin-films, integrated circuit thin-films, and for any other films and surfaces where CMP processes are useful. The terms "aluminum" and "aluminum containing alloys" are used interchangeably herein as it is within the understanding of one of skill in the art that pure aluminum is a poor conductor and that most "aluminum" containing metallization layers are actually comprised of an aluminum containing alloy, such as Al—Cu, that are good conductors.

The oxidizing agents useful in the chemical mechanical polishing slurry are incorporated into a CMP slurry to aid in oxidizing the multiple metal layers to their corresponding oxide, hydroxide, or ions. For example, in the present invention, the oxidizing agents may be used to oxidize a metal layer to its corresponding oxide or hydroxide, e.g., titanium to titanium oxide, tungsten to tungsten oxide, copper to copper oxide, and aluminum to aluminum oxide. The oxidizing agents of this invention are useful when incorporated into a polishing slurry to polish metals and metal based components including titanium, titanium nitride, tantalum, copper, tungsten, aluminum, and aluminum alloys such as aluminum/copper alloys, and various mixtures and combinations thereof by mechanically polishing the metals to remove the respective oxide layer.

The CMP slurry of this invention includes at least two oxidizers. The first oxidizer is selected from peroxy compounds which may disassociate through hydroxy radicals. Such oxidizers exhibit good polishing selectivity towards titanium. Non-exclusive examples of such peroxy compounds include peracetic acid, urea hydrogen peroxide, sodium peroxide, perboric acid, sodium percarbonate, and hydrogen peroxide, with hydrogen peroxide being the preferred first oxidizer. The first oxidizer may be present in the overall chemical mechanical polishing slurry in an amount ranging from about 0.5 to about 10.0 weight percent. It is preferred that the first oxidizer is present in the slurry in an amount ranging from about 1.0 to about 6.0 weight percent and most preferably from about 2.0 to about 4.0 weight percent.

The CMP slurry of this invention includes a second oxidizer. The second oxidizer should be capable of CMP polishing of aluminum and aluminum containing alloy metal layers with good selectivities. The second oxidizer is selected from dipersulfate and monopersulfate compounds. Ammonium persulfate is a preferred second oxidizer. The second oxidizer may be present in the chemical mechanical polishing slurry in an amount ranging from about 0.2 to about 10.0 weight percent. More preferably, the second oxidizer will be present in the chemical mechanical polishing slurry in an amount ranging from about 2.0 to about 8.0 weight percent with a range of from about 3.0 to about 5.0 being most preferred.

The CMP slurry of this invention includes an abrasive. The abrasive is typically a metal oxide abrasive. The metal oxide abrasive may be selected from the group including alumina, titania, zirconia, germania, silica, ceria and mixtures thereof. The CMP slurry of this invention preferably includes from about 1.0 to about 9.0 weight percent or more of an abrasive. It is more preferred, however, that the CMP slurry of this invention includes from about 3.0 to about 6.0 weight percent abrasive.

The metal oxide abrasive may be produced by any techniques known to those skilled in the art. Metal oxide abrasives can be produced using any high temperature process such as sol-gel, hydrothermal or, plasma process, or by processes for manufacturing fumed or precipitated metal oxides. Preferably, the metal oxide is a fumed or precipitated abrasive and, more preferably it is a fumed abrasive such as fumed silica or fumed alumina. For example, the production of fumed metal oxides is a well-known process which involves the hydrolysis of suitable feedstock vapor (such as aluminum chloride for an alumina abrasive) in a flame of hydrogen and oxygen. Molten particles of roughly spherical shapes are formed in the combustion process, the diameters of which are varied through process parameters. These molten spheres of alumina or similar oxide, typically referred to as primary particles, fuse with one another by undergoing collisions at their contact points to form branched, three dimensional chain-like aggregates. The force necessary to break aggregates is considerable and often considered irreversible. During cooling and collecting, the aggregates undergo further collision that may result in some mechanical entanglement to form agglomerates. Agglomerates are thought to be loosely held together by van der Waals forces and can be reversed, i.e., de-agglomerated, by proper dispersion in a suitable media.

Precipitated abrasives may be manufactured by conventional techniques such as by coagulation of the desired particles from an aqueous medium under the influence of high salt concentrations, acids or other coagulants. The particles are filtered, washed, dried and separated from residues of other reaction products by conventional techniques known to those skilled in the art.

A preferred metal oxide will have a surface area, as calculated from the method of S. Brunauer, P. H. Emmet, and I. Teller, J. Am. Chemical Society, Volume 60, Page 309 (1938) and commonly referred to as BET, ranging from about 5 $m^2/g$ to about 430 $m^2/g$ and preferably from about 30 $m^2/g$ to about 170 $m^2/g$. Due to stringent purity requirements in the IC industry the preferred metal oxide should be of a high purity. High purity means that the total impurity content, from sources such as raw material impurities and trace processing contaminants, is typically less than 1% and preferably less than 0.01% (i.e., 100 ppm).

In this preferred embodiment, the metal oxide abrasive consists of metal oxide aggregates having a size distribution less than about 1.0 micron, a mean aggregate diameter less than about 0.4 micron and a force sufficient to repel and overcome the van der Waals forces between abrasive aggregates themselves. Such metal oxide abrasive has been found to be effective in minimizing or avoiding scratching, pit marks, divots and other surface imperfections during polishing. The aggregate size distribution in the present invention may be determined utilizing known techniques such as transmission electron microscopy (TEM). The mean aggregate diameter refers to the average equivalent spherical diameter when using TEM image analysis, i.e., based on the cross-sectional area of the aggregate. By force is meant that either the surface potential or the hydration force of the metal oxide particles must be sufficient to repel and overcome the van der Waals attractive forces between the particles.

In another preferred embodiment, the metal oxide abrasive may consist of discrete, individual metal oxide particles having a primary particle diameter less than 0.4 micron (400 nm) and a surface area ranging from about 10 $m^2/g$ to about 250 $m^2/g$.

Preferably, the metal oxide abrasive is incorporated into the aqueous medium of the polishing slurry as a concentrated aqueous dispersion of metal oxides, which aqueous dispersion of metal oxide abrasives typically ranges from about 3% to about 45% solids, and preferably between 10% and 20% solids. The aqueous dispersion of metal oxides may be produced utilizing conventional techniques, such as slowly adding the metal oxide abrasive to an appropriate media, for example, deionized water, to form a colloidal dispersion. The dispersion is typically completed by subjecting it to high shear mixing conditions known to those skilled in the art. The pH of the slurry may be adjusted away from the isoelectric point to maximize colloidal stability.

The CMP slurry of this invention includes an organic acid. A wide range of conventional organic acids, salts of organic acids, and mixtures thereof are useful in the CMP slurry of the present invention to enhance the selectivity to oxide polishing rate, such as monofunctional acids, di-functional acids, hydroxyl/carboxylate acids, chelating, non-chelating acids, and their salts. Preferably, the organic acid is selected from the group of acetic acid, adipic acid, butyric acid, capric acid, caproic acid, caprylic acid, citric acid, glutaric acid, glycolic acid, formic acid, fumaric acid, lactic acid, lauric acid, malic acid, maleic acid, malonic acid, myristic acid, oxalic acid, palmitic acid, phthalic acid, propionic acid, pyruvic acid, stearic acid, succinic acid, tartaric acid, valeric acid and derivatives, including salts thereof.

The organic acid or salt should be present in the final CMP slurry, individually or in combination with other organic acids or salts, in an amount sufficient to enhance the oxide selectivity without detrimentally effecting the stability of the CMP slurry. As such, the organic acid is typically present in the slurry from about 0.05% to 15% by weight, and preferably in a range between 0.5% and 5.0% by weight. Examples of chemical mechanical polishing slurries including organic acids and salts thereof are disclosed in U.S. Pat. Application Ser. No. 08/644,509 which is incorporated herein by reference. A preferred organic acid is succinic acid. Succinic acid has been found to promote passivation of aluminum and it also inhibits the removal of the dielectric layer.

Other well known polishing slurry additives may be incorporated into the chemical mechanical polishing slurry of this invention. One type of optional additives are inorganic acids and/or salts thereof which may be added to the polishing slurry to further improve or enhance the polishing rate of the barrier layers in the wafer, such as titanium and tantalum. Useful inorganic additives include sulfuric acid, phosphoric acid, nitric acid, ammonium salts, potassium salts, sodium salts or other cationic salts of sulfates and phosphates.

In order to promote stabilization of the polishing slurry including oxidizing agents against settling, flocculation and decomposition, a variety of optional additives, such as surfactants, stabilizers, or dispersing agents, can be used. If a surfactant is added to the CMP slurry, then it can be an anionic, cationic, nonionic, or amphoteric surfactant or a combination of two or more surfactants can be employed. Furthermore, it has been found that the addition of a surfactant may be useful to improve the within-wafer-non-uniformity (WIWNU) of the wafers, thereby improving the surface of the wafer and reducing wafer defects. Non-limiting examples of preferred stabilizers useful in the CMP slurry of this invention include but are not limited to phosphonic acids such as aminotri(methylenephosphonic) acid, 1-hydroxyethylidene-4-diphosphonic acid, hexamethylenediaminetetramethylene phosphonic acid, and diethylenetetramine pentamethylenephosphonic acid. One or more stabilizers may be present in the CMP slurry of this invention in an amount that is sufficient to produce measurable improvements in slurry stability, and generally in an amount ranging from about 100 ppm to about 5.0 weight percent.

In general, the amount of additive such as a surfactant that may be used in the present invention should be sufficient to achieve effective stearic stabilization of the slurry and will typically vary depending on the particular surfactant selected and the nature of the surface of the metal oxide abrasive. For example, if not enough of a selected surfactant is used, it will have little or no effect on stabilization. On the other hand, too much surfactant in the CMP slurry may result in undesirable foaming and/or flocculation in the slurry. As a result, stabilizers such as surfactants should generally be present in a range between about 0.001% and 10% by weight. Furthermore, the additive may be added directly to the slurry or treated onto the surface of the metal oxide abrasive utilizing known techniques. In either case, the amount of additive is adjusted to achieve the desired concentration in the polishing slurry.

Stabilizers most useful in the CMP slurry of this invention are phosphonic acids and salts thereof. A most preferred phosphonic acid stabilizer is aminotrimethylene phosphonic acid. A phosphonic acid stabilizer may be present in the CMP slurry of this invention in an amount ranging from about 0.01 to about 5.0 weight percent. The addition of one or more phosphonic acids to the CMP slurry of this invention may also inhibit metallic corrosion.

It is desirable to maintain the pH of the CMP slurry of this invention within a range of from about 2.0 to about 8, and preferably between from about 3.5 to about 6 in order to facilitate control of the CMP process. Specifically, it has been observed that the metal surface film passivation capability of the CMP slurry of this invention is compromised at high pH's, e.g., greater than 8. Likewise, slurry handling problems and substrate polishing quality problems are encountered when the pH of the CMP slurry of this invention is too low, e.g., less than 2. The pH of the CMP slurry of this invention may be adjusted using any known acid, base, or amine. However, the use of an acid or base that contains no metal ions, such as ammonium hydroxide and amines, or nitric, phosphoric, sulfuric, or organic acids are preferred to avoid introducing undesirable metal components into the CMP slurry of this invention.

The chemical mechanical polishing slurry of this invention has been found to have a high titanium (Ti) polishing rate as well as a high polishing rates towards titanium nitride (TiN) an aluminum containing layer and especially towards an Al—Cu metal layer. In addition, the chemical mechanical polishing slurry exhibits desirable low polishing rates towards the dielectric insulating layer.

One important application for the chemical mechanical polishing slurry of this invention is as a chemical mechanical polish for thin layer films comprising titanium, aluminum and aluminum containing alloys such as Al—Cu. In such a polishing application, the single polishing slurry is effective to polish titanium, titanium nitride, and aluminum alloy containing layers. The CMP slurry of this invention preferably exhibit a Al—Cu to titanium [Al—Cu:Ti] polishing selectivity and a Al—Cu to TiN [Al—Cu:TiN] polishing selectivity of from about 2:1 to about 1:2 and preferably from about 1:1.25 to about 1.25:1. At the same time the CMP slurry of this invention exhibits a very low dielectric (SiO$_2$) polishing rate and preferably an SiO$_2$ polishing rate less than 40Å/min.

The CMP slurry may be produced using conventional techniques known to those skilled in the art. Typically, the oxidizing agent and any optional additives, are mixed into the aqueous medium, such as deionized or distilled water, at pre-determined concentrations under low shear conditions until such components are completely dissolved in the medium. A concentrated dispersion of the metal oxide abrasive, such as fumed alumina, is added to the medium and diluted to the desired loading level of abrasive in the final CMP slurry.

The CMP slurries of the present invention may be supplied as one package system (oxidizing agents, abrasive, and additives in a stable aqueous medium). To avoid possible CMP slurry degradation, however, it is preferred that at least a two package system is used where the first package comprises the first oxidizer and the second package comprises the second oxidizer. The remaining components, the abrasive, the organic acid, and any optional additives may be placed in either the first container, the second container or in a third container. Furthermore, the components in the first container or second container may be in dry form while the components in the corresponding container are in the form of an aqueous dispersion. For example, the first container may comprise the first oxidizer in aqueous form while the second container comprises an aqueous dispersion of the abrasive the second oxidizer and the organic acid. Alternately, the first container may comprise an aqueous dispersion of an abrasive and the first oxidizer while the second container may comprise the organic acid and the second oxidizer in aqueous form. Other two-container combinations of the ingredients of the CMP slurry of this invention are within the knowledge of one having ordinary skill in the art. It is preferred that the first oxidizer and the second oxidizer are held in separate containers as they may degrade over time when combined unless they are stored at low temperatures, e.g., 10° C. or less.

A multi-package CMP slurry system may be used with any standard polishing equipment appropriate for use on the desired metal layer of the wafer. The multi-package system includes one or more CMP slurry components in aqueous or dry form in two or more containers. The multi-package system is used by combining the components from the various containers in the desired amounts to give a CMP slurry comprising at least two oxidizing agents, an abrasive, and an organic acid in amounts described above.

The CMP slurry of the present invention does not significantly increase the silicon dioxide polishing rate above about 40Å/min. However, the CMP slurry of this invention significantly increases the polishing rate of titanium or titanium nitride while maintaining a high polishing rate towards aluminum and aluminum containing alloys such as Al—Cu. Thus, the CMP slurry of this invention is effective in controlling polishing selectivities of titanium, titanium nitrite and Al—Cu. The polishing slurry of the present invention may be used during the various stages of semiconductor integrated circuit manufacture to provide effective polishing at desired polishing rates while minimizing surface imperfections and defects.

EXAMPLES

We have discovered that a CMP slurry including two oxidizers is capable of polishing a multiple metal layer comprising titanium, titanium nitride, and Al—Cu at high rates while exhibiting an acceptable low polishing rate towards the dielectric layer.

The following examples illustrate preferred embodiments of this invention as well as preferred methods for using compositions of this invention.

Example 1

In this example, CMP polishing was accomplished using two CMP slurries including 4.0 weight percent ammonium persulfate, 3.0 weight percent succinic acid, 5.0 weight percent of a fumed alumina abrasive, WA-355, manufactured by the Microelectronics Materials Division of Cabot Corporation, in Tuscola, Ill. and sold under the trademark SEMI-SPERSE®, and either 0 or 3.0 weight percent hydrogen peroxide with the remainder of the slurry consisting of deionized water. The slurry was adjusted to a pH of 5.0 with ammonium hydroxide.

The CMP slurry was applied to Ti coated blanket wafers. The wafers were placed in an IPEC 472 tool manufactured by IPEC Planar. The wafers were subjected to 5 psi down force, a table speed of 45 rpm, and a spindle speed of 60 rpm. The CMP slurry was applied to a XMGH 1158 pad manufactured by Rodel, Inc. at a rate of 200 ml/min.

The titanium removal rate for the CMP slurry containing no hydrogen peroxide was 8.6 nm/min and the titanium/Al—Cu selectivity was 40.7. The titanium removal rate for the CMP slurry containing 3.0 weight percent hydrogen peroxide was 200 nm/min and the titanium/Al—Cu selectivity was 1:1. In both tests the Al—Cu removal rate was about 200 nm/min.

Example 2

This example studies the effect of varying solution pH on the aluminum polishing rates and Ti, TiN, and $SiO_2$ selectivities of a CMP slurry of this invention. This example used a CMP slurry of this invention having the following composition: 4.0 weight percent ammonium persulfate; 3.0 weight percent succinic acid; 3.0 weight percent hydrogen peroxide; 5.0 weight percent alumina abrasive (WA-355) with the remainder being deionized water. The pH of the slurry was adjusted using ammonium hydroxide to give two slurries; the first with a pH of 3.5 and the second with a pH of 5.0.

The CMP slurry was applied to Al, Ti, TiN, and $SiO_2$ blanket coated wafers. The wafers were placed in a IPEC 472 tool and polished using a 5 psi down force, a table speed of 45 rpm, and a spindle speed of 60 rpm. The CMP slurry was applied to a XMGH1158 pad at a rate of 200 ml/min. Table 1, below summarizes the results of this example.

TABLE 1

|  | pH 3.5 | pH 5.0 |
| --- | --- | --- |
| Al removal rate: | 350 nm/min | 600 nm/min |
| Al WIWNU | 7.6% | 14% |
| Sel. to Ti | 1.72:1 | 1.61:1 |
| Sel. to TiN | 1.79:1 | 3.9:1 |
| Sel. to $SiO_2$ | 88:1 | n/m |
| Dishing, 50 μm* | 57 nm | 40.5 nm |
| Dishing, 128 μm** | 198 nm | 164 nm |
| Erosion | 65 nm | 54 nm |

*the result is based on initial feature depth of 750 nm covered with 1.5 μm of AlCu.
**the result is based on initial feature depth of 750 nm covered with 0.8 μm of AlCu.

The polishing results, set forth in Table 1, above, clearly show that the CMP slurry of this invention is useful over a wide pH range.

Example 3

This example investigates the effect of the addition of phosphonic acids to a CMP slurry of this invention on titanium dissolution. A CMP slurry consisting of 4.0 weight percent ammonium persulfate, 3.0 weight percent succinic acid, 3.0 weight percent hydrogen peroxide, 5.0 weight percent alumina abrasive (WA-355), and deionized water was used in this example. The CMP slurry, with and without the addition of small amounts of aminotri (methylenephosphonic acid)) was introduced into an electrochemical cell, and the Ti dissolution rate of the freshly abraded surface was evaluated by electrochemical techniques five minutes after abrasion had ceased. The results of the tests are set forth in Table 2 immediately below:

TABLE 2

| Slurry pH | % Phosphonic Acid | Ti Dissolution Rate (Å/min) |
| --- | --- | --- |
| 3.5 | 0 | 3.4 |
| 5.0 | 0 | 6.0 |
| 5.0 | 0.1 | 3.0 |
| 5.0 | 0.5 | 1.3 |
| 5.0 | 1.0 | 1.0 |
| 8.05 | 0 | 68 |
| 8.05 | 1.0 | 3.4 |

The results of these examples demonstrate that a CMP slurrying including a first oxidizer and a second oxidizer is useful, over a wide range of pH's in polishing multiple layers of metallization in a single polishing step. The results also demonstrate that the addition of a stabilizer to a CMP slurry of this invention inhibits corrosion of a metal layer of a metal substrate.

While the present invention has been described by means of specific embodiments, it will be understood that modifications may be made without departing from the spirit of the invention. The scope of the invention is not to be considered as limited by the description of the invention set forth in the specification and examples, but rather as defined by the following claims.

What we claim is:

1. A chemical mechanical polishing slurry comprising:
   an aqueous medium of;
   an abrasive;
   from about 0.2 to about 10.0 weight percent of a first oxidizer;
   from about 0.5 to about 10.0 weight percent of a second oxidizer; and
   from about 0.5 to about 15.0 weight percent of at least one organic acid, wherein the pH of the chemical mechanical polishing slurry ranges from about 2.0 to about 8.0.

2. The chemical mechanical polishing slurry of claim 1 wherein the first oxidizer is at least one peroxy compound which may disassociate through hydroxyl radicals.

3. The chemical mechanical polishing slurry of claim 2 wherein the first oxidizer is hydrogen peroxide.

4. The chemical mechanical polishing slurry of claim 1 wherein the second oxidizer is at least one dipersulfate salt or acid or monopersulfate salt or acid.

5. The chemical mechanical polishing slurry of claim 4 wherein the second oxidizer is ammonium persulfate.

6. The chemical mechanical polishing slurry of claim 1 wherein the abrasive is a metal oxide.

7. The chemical mechanical polishing slurry of claim 5 wherein the metal oxide abrasive is selected from the group including alumina, ceria, germania, silica, titania, zirconia, and mixtures thereof.

8. The chemical mechanical polishing slurry of claim 1 wherein the abrasive is an aqueous dispersion of a metal oxide.

9. The chemical mechanical polishing slurry of claim 7 wherein the metal oxide abrasive consists of metal oxide aggregates having a size distribution less than about 1.0 micron and a mean aggregate diameter less than about 0.4 micron.

10. The chemical mechanical polishing slurry of claim 7 wherein the metal oxide abrasive consists of discrete, individual metal oxide spheres having a primary particle diameter less than 0.400 micron and a surface area ranging from about 10 $m^2/g$ to about 250 $m^2/g$.

11. The chemical mechanical polishing slurry of claim 1 wherein the abrasive has a surface area ranging from about 5 m²/g to about 430 m²/g.

12. The chemical mechanical polishing slurry of claim 11 wherein the abrasive has a surface area of from about 30 m²/g to about 170 m²/g.

13. The chemical mechanical polishing slurry of claim 7 wherein the abrasive is selected from the group consisting of precipitated abrasives or fumed abrasives.

14. The chemical mechanical polishing slurry of claim 13 wherein the abrasive is selected from the group consisting of silica, alumina, and mixtures thereof.

15. The chemical mechanical polishing slurry of claim 1 wherein the organic acid is succinic acid.

16. The chemical mechanical polishing slurry of claim 1 further including a surfactant.

17. The chemical mechanical polishing slurry of claim 1 further including a stabilizer.

18. A chemical mechanical polishing slurry comprising:
    an aqueous medium;
    from about 1.0 to about 9.0 weight percent alumina;
    from about 0.5 to about 10.0 weight percent hydrogen peroxide;
    from about 0.2 to about 10.0 weight percent ammonium persulfate; and
    from about 0.5 to about 5.0 weight percent succinic acid, wherein the pH of the chemical mechanical polishing slurry ranges from about 2.0 to about 8.0.

19. The chemical mechanical polishing slurry of claim 18 wherein hydrogen peroxide is present in the composition in an amount ranging from about 1.0 to about 6.0 weight percent.

20. The chemical mechanical polishing slurry of claim 18 wherein ammonium persulfate is present in the composition in an amount ranging from about 2.0 to about 8.0 weight percent.

21. The chemical mechanical polishing slurry of claim 18 wherein the alumina is present in the composition in an amount ranging from about 3.0 to about 6.0 weight percent.

22. The chemical mechanical polishing slurry of claim 18 including from about 100 ppm to about 5.0 weight percent of a stabilizer.

23. The chemical mechanical polishing slurry of claim 18 having a Ti/Al—Cu selectivity of from about 1:2 to about 2:1.

24. A method for polishing a substrate including at least one metal layer comprising the steps of:
    (a) admixing, from about 1.0 to about 9.0 weight percent of an abrasive, from about 0.2 to about 10.0 weight percent of a first oxidizer, from about 0.5 to about 10.0 weight percent of a second oxidizer, from about 0.5 to about 3.0 weight percent of at least one organic acid, and deionized water to give a chemical mechanical polishing slurry;
    (b) applying the chemical mechanical polishing slurry to the substrate; and
    (c) removing at least a portion of the metal layer from the substrate by bringing a pad into contact with the substrate and moving the pad in relation to the substrate.

25. The method of claim 24 wherein the substrate includes a titanium adhesion layer and an aluminum alloy containing layer and wherein at least a portion of the titanium layer and at least a portion of the aluminum alloy containing layer are removed in step (c).

26. The method of claim 24 wherein the substrate further includes a titanium nitride layer wherein at least a portion of the titanium nitride layer is removed in step (c).

27. The method of claim 24 wherein the chemical mechanical polishing slurry is applied to the pad before the pad is placed into contact with the substrate.

28. The method of claim 24 wherein the first oxidizer is at least one peroxy compound that may disassociate through hydroxyl radicals.

29. The method of claim 28 wherein the first oxidizer is hydrogen peroxide.

30. The method of claim 24 wherein the second oxidizer is at least one dipersulfate salt or acid or monopersulfate salt or acid.

31. The method of claim 30 wherein the second oxidizer is ammonium persulfate.

32. The method of claim 24 wherein the abrasive is a metal oxide.

33. The method of claim 32 wherein the metal oxide abrasive is selected from the group including alumina, ceria, germania, silica, titania, zirconia, and mixtures thereof.

34. The method of claim 24 wherein the abrasive is an aqueous dispersion of a metal oxide.

35. The method of claim 34 wherein the metal oxide abrasive is selected from the group consisting of precipitated alumina, fumed alumina, precipitated silica, fumed silica, and mixtures thereof.

36. The method of claim 24 wherein the organic acid is succinic acid.

37. A method for polishing a substrate including a titanium adhesion layer, a titanium nitride layer and an aluminum alloy containing layer comprising:
    (a) admixing, hydrogen peroxide, ammonium persulfate, succinic acid, and alumina with deionized water to give a mechanical chemical polishing slurry comprising from about from about 1.0 to about 9.0 weight percent alumina, from about 0.2 to about 10.0 weight percent ammonium persulfate, from about 0.5 to about 10.0 weight percent hydrogen peroxide, and from about 0.5 to about 3.0 succinic acid, wherein the pH of the chemical mechanical polishing slurry ranges from about 2.0 to about 8.0 and wherein the titanium to aluminum alloy polishing selectivity ranges from about 2:1 to about 1:2;
    (b) applying the chemical mechanical polishing slurry to the substrate; and
    (c) removing a least a portion of the titanium adhesion layer, at least a portion of the titanium nitride layer and at least a portion of the aluminum alloy layer by bringing a pad into contact with the substrate and moving the pad in relation to the substrate.

38. The method of claim 24 wherein the substrate is selected from the group consisting of integrated circuits, thin films, multiple level semiconductors, and wafers.

* * * * *

UNITED STATES PATENT AND TRADEMARK OFFICE
CERTIFICATE OF CORRECTION

PATENT NO. : 5,783,489
DATED : July 21, 1998
INVENTOR(S) : Kaufman et al.

It is certified that error appears in the above-identified patent and that said Letters Patent are hereby corrected as shown below:

At column 12, line 48 insert - - Ti/Al-Cu - - before "ranges" and after "selectivity"

Signed and Sealed this

Fifteenth Day of February, 2000

Attest:

Q. TODD DICKINSON

*Attesting Officer*    *Commissioner of Patents and Trademarks*